(No Model.)

J. H. MITCHELL.
CAKE AND CONFECTIONERY DROPPING MACHINE.

No. 245,539. Patented Aug. 9, 1881.

Witnesses:
A. P. Grant
W. F. Kircher

Inventor:
J. Henry Mitchell
by John A. Diedersheim
ATTORNEY.

UNITED STATES PATENT OFFICE.

J. HENRY MITCHELL, OF PHILADELPHIA, PENNSYLVANIA.

CAKE AND CONFECTIONERY DROPPING MACHINE.

SPECIFICATION forming part of Letters Patent No. 245,539, dated August 9, 1881.

Application filed February 10, 1881. (No model.)

*To all whom it may concern:*

Be it known that I, J. HENRY MITCHELL, a citizen of the United States, residing in the city and county of Philadelphia, and State of Pennsylvania, have invented a new and useful Improvement in Cake and Confectionery Dropping Machines, which improvement is fully set forth in the following specification and accompanying drawings, in which—

Figure 1:
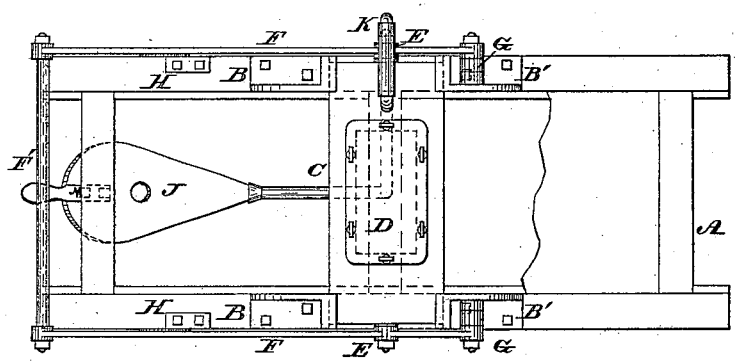
Figure 2:
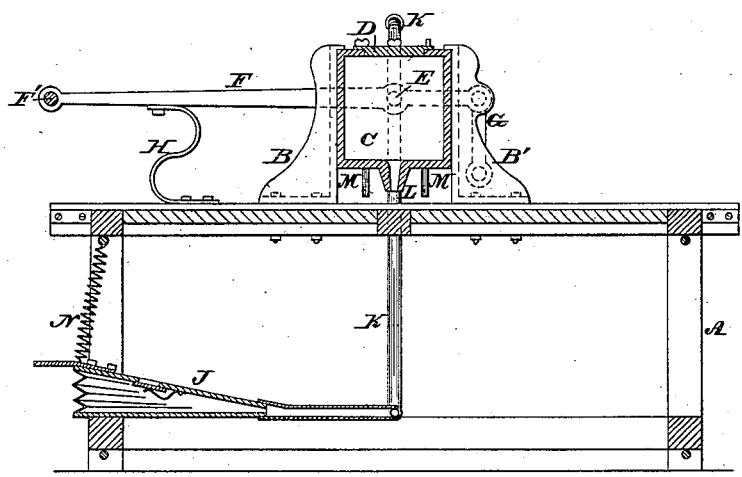

Figure 1 is a top or plan view of the machine embodying my invention. Fig. 2 is a central longitudinal vertical section thereof.

Similar letters of reference indicate corresponding parts in the several figures.

My invention consists of a dough or other material chamber or box adapted to be lowered to the bake or holding pan and raised therefrom, so as to break the connection of the shaped cake, confectionery, &c., respectively, by means of a depressing-lever and elevating-spring.

It also consists of a dough or other material chamber or box in which the flow of the material and stoppage thereof are occasioned by the pressure and exhaustion of air, the invention being hereinafter especially described as applied to the manufacture of cake.

Referring to the drawings, A represents the frame of the machine, the top of which forms a flat table for the bake-pan, and is illustrated broken away in Fig. 1, said table being stationary, so far as rising and falling motions are concerned.

From each side of the table rise two upright guides, B B', which are firmly secured to the table, and between the guides is fitted a vertically-moving dough-box, C, which is provided with an air-tight cover or lid, D, and having at each side a trunnion, E, to which is attached a lever, F. The fulcra of the levers F are links G, which are pivoted to the guides B' or frame A, and the opposite ends of the levers are connected by a girt or handle, F'.

H represents springs, which are secured to the table or frame A and bear against the levers F, so as to raise the box C and hold it elevated, said springs in the present case being S-shaped, but other forms may be used.

Supported on the frame A is an air-pump or air forcing and exhausting apparatus, J, having a connected pipe, K, which communicates with the dough-box C, at the upper part thereof, a portion of said pipe being flexible, in order to conform to the movement of the box.

Depending from the bottom of the box C are a number of outlet-nozzles, L, and likewise of stops M, and connected to the air-pump J is a spring, N, for restoring it to its normal position.

The operation is as follows: The top or lid D is opened or removed and the box C supplied with soft dough, after which the lid is restored and secured. A pan is now placed under the box on the table, between the guides B B', and the box depressed by the levers F, the stops M flattening and holding the pan on the table. The air-pump is then operated, thus forcing air into the box C, and causing dough to flow through the nozzles L and be deposited upon the pan. When sufficient dough has been discharged the air-pump is released and, owing to the action of the spring N, returns to its normal position, whereby the air is drawn from the box and the flow of dough stopped. The dough-box is now raised, either by hand or action of the springs H, and the connection of the nozzles and shaped dough or cake is thereby broken. The occupied pan is removed and another pan applied, and the operations are repeated.

I disclaim in the present application the subject-matter of the first and fifth clauses of claim of the application filed by me on December 15, 1880, as follows:

"1. The combination of a material-box, a pan-supporting table, and means for separating said box and table, whereby, when the machine is in operation, the material flows in streams, and when the deposit is made the connection between the deposit and the nozzles or outlets of the box is broken."

"5. The bottom of the material-box having discharge-nozzles, and provided with pendent stops longer than the nozzles."

Having thus described my invention, what I claim as new, and desire to secure by Letters Patent, is—

1. The rising and falling box C and stationary table with guides B B', in combination with the lever F and spring H, substantially as and for the purpose set forth.

2. A dough or material box and a communicating air-pump or apparatus combined and operating substantially as described, whereby, by the alternate action of the pressure and exhaustion of the air, the flow of the material and stoppage thereof are respectively occasioned, as and for the purpose stated.

3. The rising and falling box C, air-pump or apparatus J, and connecting-pipe K, substantially as and for the purpose set forth.

J. HENRY MITCHELL.

Witnesses:
JOHN A. WIEDERSHEIM,
A. P. GRANT.